Jan. 26, 1965  G. F. MEYER, JR., ET AL  3,167,045
REFRACTORY FIXTURE

Filed May 17, 1961  3 Sheets-Sheet 1

INVENTORS
George F. Meyer, Jr.
Clarence J. Forster
BY McCoy, Greene & LeBlanchein
ATTORNEYS

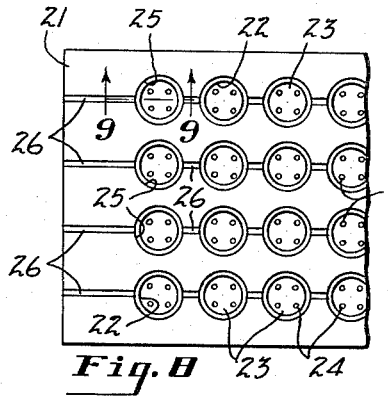
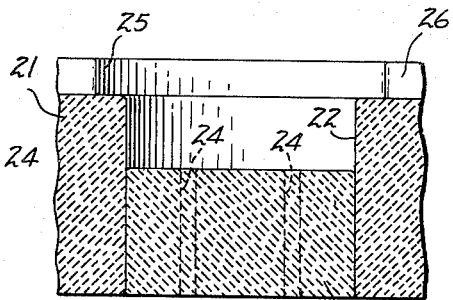
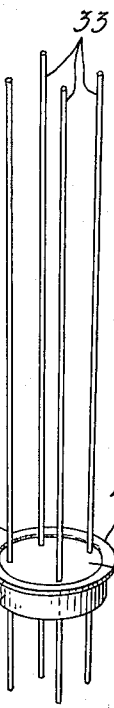
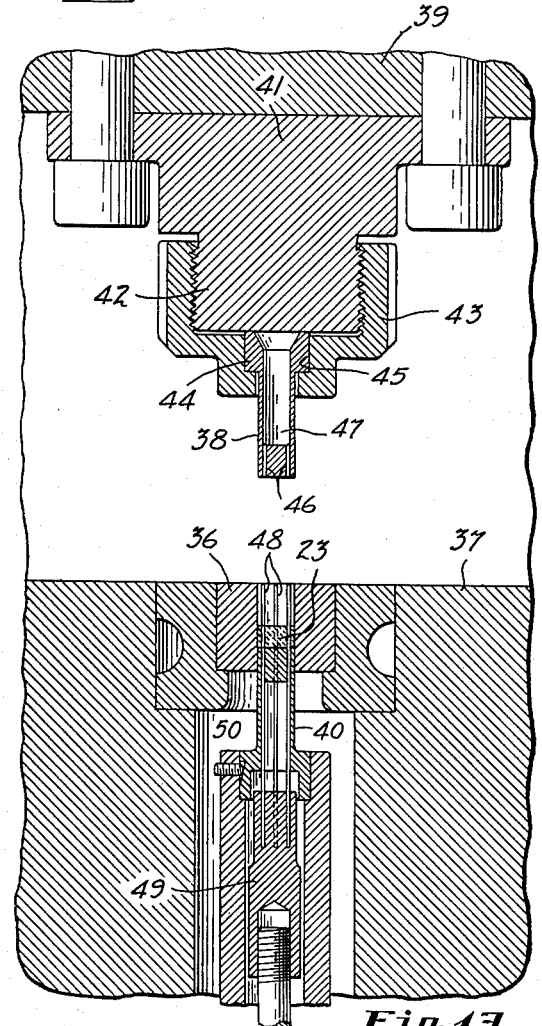
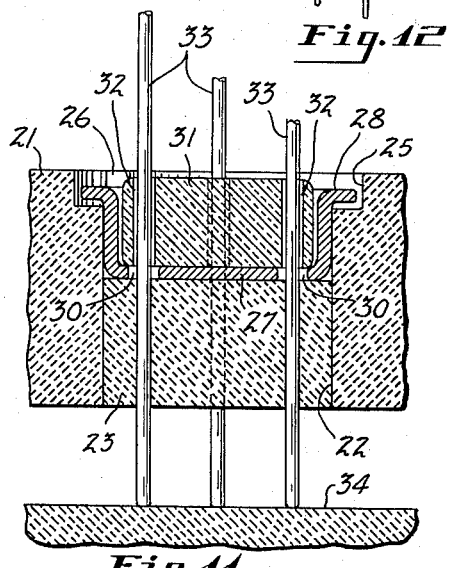

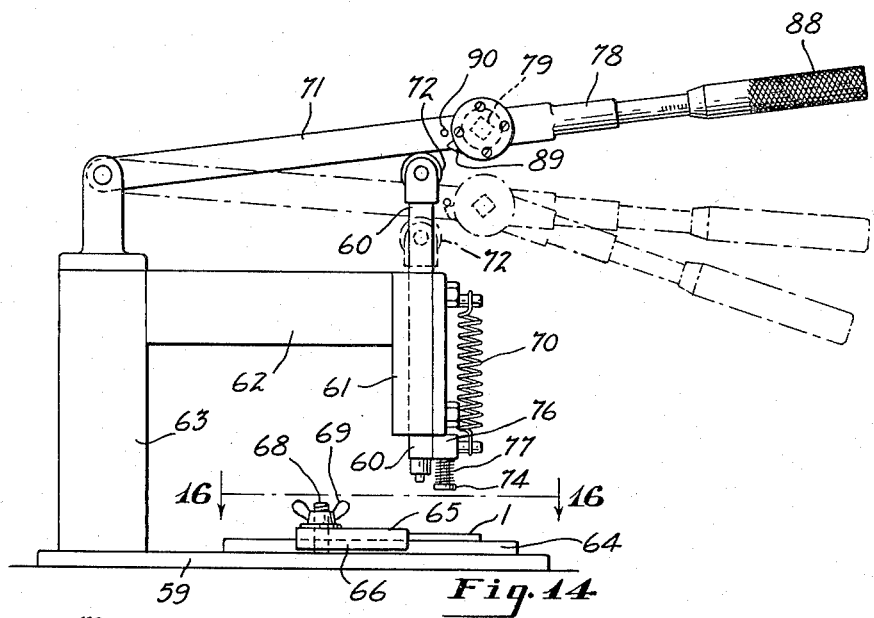
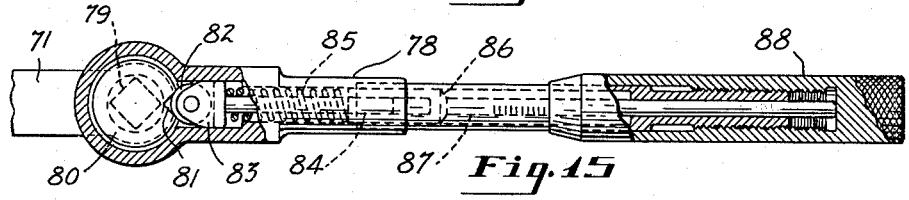
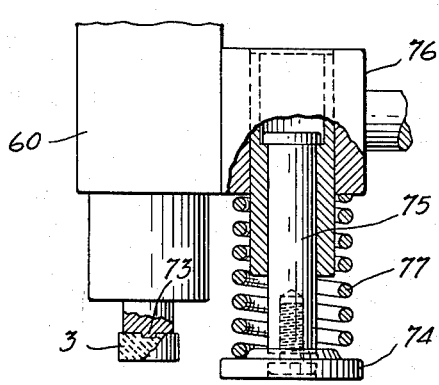
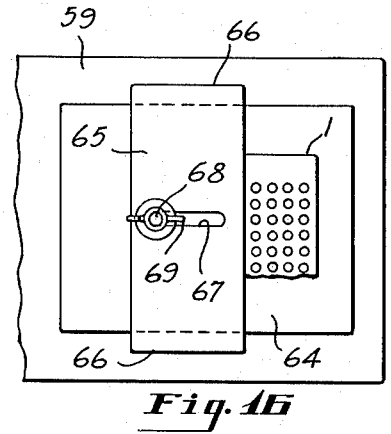
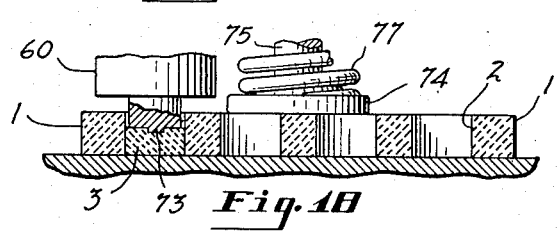

United States Patent Office 3,167,045
Patented Jan. 26, 1965

3,167,045
REFRACTORY FIXTURE
George F. Meyer, Jr., Benzinger Township, and Clarence J. Forster, St. Marys, Pa., assignors to Pure Carbon Company, Inc., St. Marys, Pa., a corporation of Pennsylvania
Filed May 17, 1961, Ser. No. 110,706
9 Claims. (Cl. 113—99)

This invention relates to refractory fixtures for supporting parts in fixed positions while they are being heated, and particularly to a fixture for holding parts of an assembly in predetermined relative positions while they are being joined together as a unit by fusion of one or more of the parts.

In the manufacture of transistors and other rectifying and amplifying devices employing semi-conductors it is necessary to provide positioning fixtures or carriers composed of refractory materials to position parts that are to be joined together by fusion during their passage through a heating oven.

One operation which requires such refractory fixtures is the attachment of an alloy dot or electrode to a semi-conductor by fusing a metal pellet while it is held in contact with the semi-conductor.

Another operation requiring refractory fixtures is the so-called "glassing" operation in which small conductor wires such as those to be attached to a semi-conductor and to the electrode forming dots attached thereto are secured together in fixed relative positions by means of a body of glass joined to the wires and to a supporting member by fusion.

Refractory carbon compositions have been found to be the most suitable material for such carriers or fixtures because of the fact that plates cut from carbon blocks that have been molded or extruded and baked are readily machinable, have a very low coefficient of expansion and are not adversely affected by the heat required to melt glass or metal pellets such as used to provide the alloy dots. Furthermore, carbon is not wetted by either the molten glass or the molten metal and there is no adhesion between the carbon and the metal or between the carbon and the glass.

In fixtures for use in applying the metal dots to the semi-conductor, a series of recesses are formed in one face of a carbon plate and the bottoms of these recesses are further recessed to position the semi-conductor which is usually in the form of a thin wafer of germanium or other suitable metal. In order to apply an alloy dot to the underside of the semi-conductor, a recess is formed in the bottom of the first mentioned positioning recess to receive a small pellet of the metal which is to form the dot on the semi-conductor. The pellet receiving recess is of a depth slightly less than the diameter of the pellet so that contact with the semi-conductor is insured. On top of the semi-conductor is placed a small carbon block which may serve to position a second pellet of the electrode forming metal and which may also serve as a weight to maintain a slight pressure between the semi-conductor wafer and the metal pellet or pellets engaging the wafer. In some instances a plurality of dots may be placed upon one or both sides of the semi-conductor, in which case a plurality of properly positioned pellet positioning recesses may be provided in the carbon positioning members.

The semi-conductor units are usually quite small and may be accommodated in recesses that are arranged in parallel rows on one face of the carrier plate, a large number of recesses being usually formed in a single carrier plate.

It is impractical to attempt to mold a carbon fixture with a series of spaced positioning recesses in its face due to the fact that the carbonization of the binder causes considerable shrinkage which is not sufficiently uniform to prevent warping of the fixture to an extent such that the fixture would not have the flatness and uniformity necessary for accurately positioning the parts of the assemblies to be joined together by heating. It has, therefore, heretofore been the common practice to make such fixtures by cutting flat plates from carbon blocks that have been formed by molding and baking and by machining the positioning recesses in one face of the plate by means of suitable cutting tools and in making the glassing fixture, to drill the small wire positioning holes. The large number of machining operations required to make a single fixture and the accuracy required has made the manufacture of these carbon fixtures quite costly.

In the so-called "glassing" operation, recesses are cut in longitudinal and transverse rows on one face of a carbon plate and positioning holes for the lead wires opening to the bottom of each of the recesses are drilled through the plate. The drilling of small diameter positioning holes one at a time is a very tedious operation as will be apparent since a plurality of closely spaced holes are required for each recess.

The circular recesses are of a size to receive a holder usually in the form of a shallow metal cup which has openings through which the wires extend. Within each cup there is placed a molded disk formed of powdered glass held together with a suitable binder and provided with openings to receive the individual wires. The molded glass disk may fit loosely in the cup and the wire receiving openings of the cup and glass disk may loosely receive the wires. The wires are positioned by the holes in the supporting fixture which serve to center the wires with respect to the cup openings. A second plate may be provided below the wire positioning plate at a distance below the same such that the wires may be inserted through the openings in the molded glass disks, the metal cups and the fixture into engagement with the lower plate.

After the parts of all of the units are assembled in the fixture the fixture is passed through a suitable heating oven where the glass is fused and caused to adhere to the metal cup and to the wires passing through the glass disk so that the wires are permanently fixed in position for subsequent attachment to the semi-conductor and electrodes.

In the manufacture of these carbon carriers or fixtures either for the dot forming or the glassing operation, it has been found to be quite difficult to maintain the desired accuracy and there has been a considerable percentage of rejected carriers because of imperfections in the machining operations, and the life of such carriers has been relatively short because of enlargement of the positioning recesses or wire positioning holes due to wear and to deterioration due to repeated heating.

The present invention provides a fixture or carrier which can be manufactured at much less cost and which is much more durable than fixtures heretofore manufactured. The fixture of the present invention makes unnecessary most of the tedious machining operations heretofore required and increases the life of the fixture by providing molded recesses and wire positioning openings which are much more abrasion resistant and more heat resistant than the machined surfaces heretofore provided. The surface of a machined hole, slot or recesses in a carbon slab is relatively soft and porous and has much less abrasion resistance and less heat resistance than the tough skin formed upon a recess or aperture formed by molding and baking.

The carrier of the present invention is formed by drilling a cylindrical hole entirely through the flat plate which forms the body of the carrier, one for each of the assemblies to be supported thereon. Each of these holes has press fitted therein a molded insert which is provided with positioning recesses or apertures. In the case of the dot forming fixture, the inserts are of a size to permit molding of the desired wafer and dot positioning recesses in and end face thereof and may be positioned with its top face below the top face of the plate.

Since the inserts are of relatively small dimensions their shape is not materially altered by shrinkage due to baking and it is possible to provide recesses of the desired configuration or holes of the desired diameter which are not appreciably distorted by shrinkage. In order to accurately form the inserts to the diameter required for a tight press fit in the machine openings of the plate, it is necessary to accurately determine the amount of shrinkage of the particular molding mix employed in order to provide the necessary interference between the insert and the opening into which it is to be forced. The shrinkage of the molded inserts upon baking may be from 4% to 10% for carbon compositions and in order to provide finished inserts of uniform diameter, it is necessary to accurately predetermine the shrinkage of the mixture employed for molding the inserts and for each batch of such mixture it is desirable to carefully determine the percentage of binder in the carbon flour or mixture of such flour with other materials that will cause the molded insert to shrink to the exact diameter desired. It is necessary that the inserts be held tightly enough in the carrier plate to insure against loosening of the inserts while in use. On the other hand, the expanding pressure of the inserts must not be great enough to create stresses therein likely to cause rupture of the plate in which the inserts are mounted. Slight variations in the size of the opening drilled in the plate may be caused by wear on the drills or variations in the speed of rotation of the drills and, in order to insure the retention of the inserts and to avoid excessive stresses in the plate, the inserts are pressed into place by the application of a pressure that exceeds a predetermined minimum and that is not greatly in excess of said predetermined minimum. The press which is employed to force the inserts into the openings of the plate has a stroke which is just sufficient to force an insert to the desired position in its hole. The movable press platen may be actuated through a manually operated torsion controlled lever which is so connected to the movable platen that when a predetermined pressure is applied to the plunger before the completion of its stroke a detent is released which permits a slight additional movement of the lever. If the insert is completely inserted without release of the detent and the free movement of the actuating lever due to such release, less than the predetermined pressure has been required to insert it and it is too loose. If, on the other hand, the insert is not substantially all the way in upon release of the detent and more than a slight additional pressure is required to press it fully into place, its fit is too tight. Inserts found to be too loose or too tight are removed and replaced with a slightly larger or slightly smaller insert which will have the required fit in the opening.

The slightly oversize and undersize inserts may be made either by providing molds varying slightly in diameter, by grinding or by providing a molding mix containing slightly less or slightly more binder than that for the standard inserts, so that they will shrink slightly less or slightly more when baked. By providing inserts varying slightly in size, the proper press fit may be provided for all of the inserts.

The cylindrical inserts are preferably formed from a suitable mixture of fine carbon flour and binder in a press of the type commonly used for molding powdered materials. The recesses in the end faces of the inserts for positioning the semi-conductor wafer and the alloy pellets to be integrally united to the wafers may be formed by providing projections of the proper size and shape on the end of a press plunger, and wire positioning openings in the insert of the glassing fixture may be provided by needle-like projections fixed to a press member.

The material from which the carrier plates are formed and the material from which the cylindrical inserts are formed must have coefficients of expansion which do not differ sufficiently either to cause the inserts to be loosened when subjected to any temperature to which the fixture may be subjected in service or to cause the insert to exert enough radial pressure to damage the carrier plate when so heated. Provided the coefficients of expansion are maintained within the necessary tolerance limits the compositions of the inserts and carrier plates may be quite different. For example, the carrier plate may be composed of a material compounded to provide relatively high tensile strength while the inserts may be made of a material compounded to provide relatively high abrasion resistance.

Carbon base compositions are preferred for both the carrier and the inserts because of the fact that carriers formed of such compositions are readily machinable and holes of the desired diameter within very small tolerance limits may be readily drilled in such carriers and inserts of the desired dimensions and configuration can be readily molded.

Carbon base materials including graphite either natural or artificial may be employed and the term carbon as herein used is to be understood to include graphite.

Refractory compositions such as graphite clay mixtures in which the clay serves as the binder may be used for the carrier or for both the carrier and insert. Various ceramic refractory compositions are commonly compounded to provide a solid with a desired coefficient of expansion that has a fine grained body of a desired hardness in which holes of the desired diameter may be drilled. Such ceramic compositions may be employed for the carrier.

In order to insure uniformity in the size of inserts and in order to reduce the difficulty of obtaining the proper press fit in the hole of the plate, it is desirable that the batches of material employed in making the carrier plates be of sufficient volume for making a large number of the plates and that correspondingly large batches of material be provided for the molding of inserts.

Reference should be had to the accompanying drawings, in which:

FIG. 8 is a plan view of a glassing fixture embodying the invention;

FIG. 9 is a section through one of the molded inserts that has been press fitted into a hole formed in the carrier plate;

FIG. 10 is a perspective view of one of the inserts employed in the glassing fixture;

FIG. 11 is a sectional view showing the manner in which the retaining cup, glass and wire are positioned in the fixture;

FIG. 12 is a perspective view of the wire assembly produced by the use of the glassing fixture;

FIG. 13 is a sectional view of an insert molding press suitable for molding the wire positioning insert;

FIG. 14 is a side elevation of the press employed for placing the inserts in the holes of the carbon plate;

FIG. 15 is a view partially in side elevation and partially in section, showing the means for limiting the torque applied to the press actuating lever;

FIG. 16 is a plan view of the work positioning members on the press bed;

FIG. 17 is a fragmentary side elevation of the lower portion of the plunger with parts broken away and shown in section; and FIG. 18 is a fragmentary sectional view showing the plunger at the completion of its downward stroke.

Figure 1:
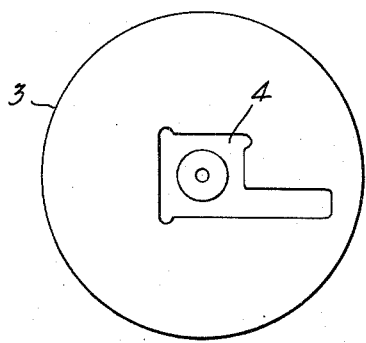
FIGURE 1 is a top plan view of one of the molded positioning elements employed in the fixture of the present invention.
Figure 2:
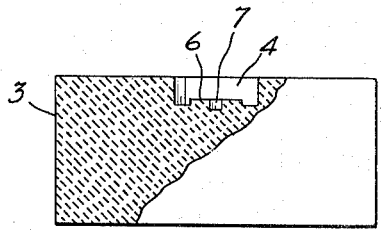
FIG. 2 is a side elevation of the molded insert partially broken away and shown in section.
Figure 3:
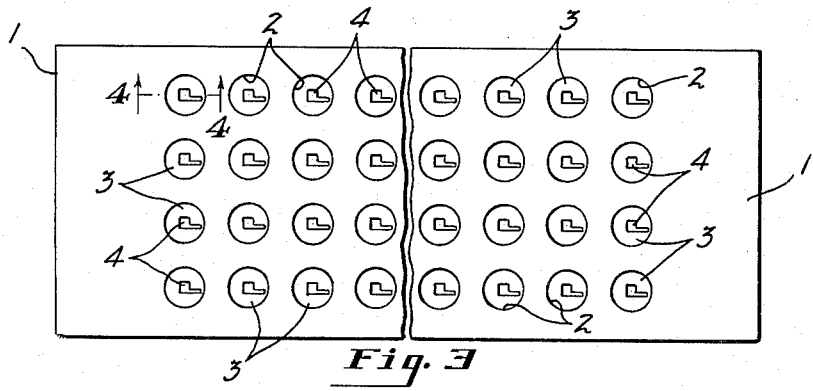
FIG. 3 is a plan view of the positioning fixture of the present invention showing the inserts assembled in holes drilled in a carbon plate.
Figure 4:
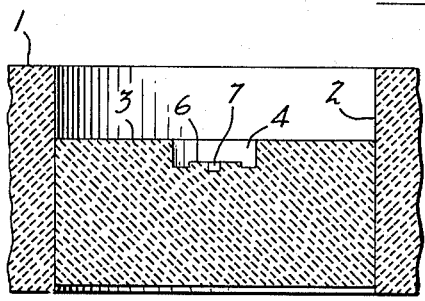
FIG. 4 is a section taken on the line indicated at 4—4 in FIG. 3 and showing one of the molded carbon inserts after it has been press fitted in one of the holes of the carbon carrier plate.
Figure 5:
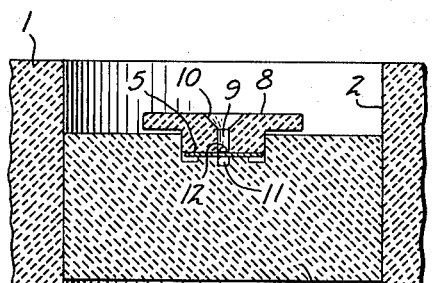
FIG. 5 is a section similar to FIG. 4 showing a semi-conductor wafer and metal pellets assembled on the molded insert and positioned between the insert and a second molded carbon positioning member which serves as a weight to hold the wafer and pellets in proper assembled relation.

FIGURES 1 to 7 of the drawings show the invention applied to a fixture for use in applying alloy dots to a semi-conductor such as employed in transistors. The body of this fixture is formed by a flat plate 1 of refractory material. The plate 1 has rows of cylindrical holes 2 drilled through it which receive inserts 3 which have been molded from a suitable refractory material having a coefficient of expansion closely corresponding to that of the material employed in making the plate 1.

As herein shown, each of the inserts is molded with a recess 4 in its top face that conforms to the shape of a wafer 5 of semi-conductive material such as germanium. The bottom of the recess 4 is provided with a raised central portion 6 provided with a pellet positioning recess 7. A molded weight 8 is formed to slidably fit in the recess 4 with its bottom face resting upon the wafer 5. The weight 8 may be provided with a central opening 9 which has a flaring upper portion 10. A metal pellet 11 of a diameter slightly greater than the depth of the recess 7 is placed in the recess 7 before the wafer 5 is placed in the recess 4 and, after the weight 8 has been placed upon the wafer, an upper pellet 12 can be placed on the top of the wafer 5 by dropping it through the opening 9.

Figure 6:
FIG. 6 is a perspective view of the wafer formed of germanium or other semi-conductive material after the dots have been formed thereon by fusion of the metal pellets.

After the wafers and pellets have been assembled in each of the inserts carried by the plate 1, the fixture is placed in a furnace where sufficient heat is applied to fuse the pellets and unite them to the wafer 5, the pellets forming the so-called dots or electrodes such as shown at 12a in FIG. 6.

Figure 7:
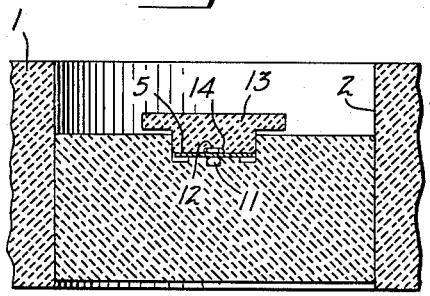
FIG. 7 is a section similar to FIG. 5 showing a modified form of molded carbon pellet positioning weight.

In FIG. 7 of the drawing a modified form of weight 13 is shown which has a recess 14 on its under side which is of a depth slightly less than the metal pellet which it positions, so that the weight exerts pressure on both the upper and lower pellets. In some instances a plurality of dots or electrodes are applied to one or both faces of the semi-conductor, in which case recesses positioned in accordance with the desired positions of the dots will be provided both in the molded insert and in the molded weight.

In FIGS. 8 to 11 of the drawings the invention is illustrated as applied to the production of a conductor unit comprising a plurality of conductor wires secured in fixed relative position in a suitable holder. This fixture comprises a flat carrier plate 21 provided with rows of cylindrical drilled openings 22 in which molded cylindrical inserts 23 are press fitted. Each of the inserts 23 has wire positioning openings 24 molded therein which are small enough in diameter to hold the wires against angular movements and in proper spaced relation in the fixture. The inserts 23 are usually placed in the plate with their top faces below the top face of the plate. Each of the openings 22 may be provided with a counterbore 25 at the top of the plate 21 and may also be provided with longitudinal slots 26 which intersect the openings centrally thereof and which may be of the same depth as the counterbore 25.

A metal cup 27 fits loosely in the opening 22 above the insert 23 and has a rim flange 28 that is received in the counterbore 25. A tab 29 formed integrally with the flange 28 is received in a slot 26 to position the openings 30 in the bottom of the cup in registry with the openings 24 of the carbon insert 23. Within the cup 27 there is placed a disk 31 which may be formed by molding a mixture of glass powder and a binder. This disk is provided with suitable apertures 32 through which the wires 33 may extend. When assembled as shown in FIG. 11, the wires are positioned in the holes 24 of the insert 23 and extend centrally through the holes 30 in the cup 27 and through the apertures 32 in the glass disk 31. The lower ends of the wires 33 rest on a stop member 34 which may be in the form of a second plate attached to the plate 21. When the fixture with the wire assemblies in place thereon is passed through the furnace, the glass disks are melted to fill the cups 27 and securely hold the wires 33 in proper spaced relation and to insulate the wires that pass through the openings 30 from the cup 27 as shown in FIG. 12 of the drawings.

In FIG. 13 of the drawings there is shown a molding press suitable for molding glassing inserts such as the insert 23. This mold is of a conventional type in which a tubular die 36 is mounted in a press bed 37 in position to receive a pressure applying punch 38 attached to a movable press head 39. The bottom of the mold cavity is formed by a stripper punch 40 which fits in the tubular die 36 and which is movable from a lower position in which it forms the bottom of the mold cavity to an upper position where it supports a molded insert above the upper end of the die 36. The punch 38 is attached to a holder 41 that is detachably bolted to the movable head 39. The holder 41 has an externally threaded downwardly extending projection 42. The punch 38 is held in place by means of a clamping cap nut 43 screwed on the threaded extension 42. The punch 38 has an enlarged upper end portion 44 that bears against the lower end of the projection 42 and that fits in a recess 45 in the cap nut 43. The punch 38 has small diameter holes 46 extending axially from its lower end face to the lower end of a bore 47 and these holes slidably receive small diameter pins 48 that are attached to a block 49 that is supported in fixed position beneath the portion of the stripper punch 40 that fits in the die 36.

The pins 48 have a sliding fit in holes 50 in the upper end of the punch 40 and have their upper ends near the top of the die 36. The die 36 is filled with powdered material while the punch 38 is in raised position. When the punch 38 enters the die 36 the pins 48 enter the holes 46 which are of a diameter but slightly greater than that of the pins 48 so that the pins are firmly held while the powdered material is compressed. During the return or up stroke of the punch 38, the stripper punch is moved upwardly to lift the molded block to a position clear of the pins 48 and die 36.

It will be understood that suitable feeding means for powdered material may be provided for feeding a charge of powdered material into the die 36 while the plunger is in elevated position and that suitable connections may be provided between the reciprocating head and the stripper punch 40 to raise the punch 40 during the upward stroke of the press head.

It will also be understood that a similar press may be employed for molding the insert 3 employing a punch having its bottom face formed to provide the desired indentations in the top face of the molded insert.

FIGS. 14 to 18 of the drawings show a press designed to insure the application of a predetermined minimum pressure to the inserts when press fitting them in the carrier plate. This press has a base 59 for supporting the carrier plate while the inserts are being pressed into the holes thereof and is provided with a vertically movable plunger 60 that is slidably mounted in a vertical guide 61 attached to the outer end of an arm 62 attached to a post 63 extending upwardly from the base 59. A bed plate 64 is attached to the bed 59 and supports an adjustable guide member 65 which is guided for movement on the plate 64 by means of end flanges 66 that engage the opposite side edges of the plate 64. The guide member 65 has a slot 67 parallel with the flanges 66 which receives a threaded pin 68 fixed to the bed plate 64 and is held in adjusted positions by means of a nut 69 screwed on the threaded pin 68. The plunger 60 is normally held in raised position by means of a spring 70 attached at its opposite ends to the arm 62 and to the punch 60. The punch is moved downwardly in opposition to the spring 70 by means of a lever arm 71 pivoted to the post 63 and having its under side in engagement with a roller 72 mounted on the upper end of the punch 60. The lower end of the punch 60 is provided with a projection 73 which has a close fit in a recess or hole formed in the molded insert to be pressed into an opening of the carrier plate which serves to support the insert and position it for insertion into the hole of the carrier plate.

To prevent the carrier plate from being lifted off of the bed plate upon upward movement of the plunger 60, a pressure pad 74 is provided which is carried by the punch and which is yieldably supported for engagement with the carrier plate as the punch approaches its lowermost position. The pad 74 is supported by a vertical pin 75 that has limited sliding movement in a bracket 76 attached to the punch 60 and is held in its lowermost position with respect to the punch by means of a spring 77 interposed between the bracket 76 and the pad 74. The pad 74 is positioned to engage with the plate 1 while the insert is being pressed into an opening of the plate and maintains pressure on the plate while the punch is being pulled free of the insert.

It has been found that if too little pressure is required to force an insert into an opening of the carrier plate, the insert is likely to work loose and drop out of the plate after one or more passages through the heating furnace. On the other hand, it has been found that if too much pressure is applied to the inserts in pressing them into the holes of the carrier plate, stresses will be set up in the plate which will either rupture the plate or which cause cracks to form in the fixture while in use. It is, therefore, desirable that means be provided for inserting the inserts into the holes of the carrier plate which will enable the operator to determine when less than the necessary amount of pressure has been required to place the insert and to also enable the operator to determine when more than a desirable amount of pressure is required. To this end, the lever arm 71 has a pivoted extension 78 which is so connected to the arm 71 that it is released and permitted to have a limited pivotal movement with respect to the arm 71 whenever a predetermined torque is applied to the pivot connecting the extension 78 to the arm 71. This torque connection is adjustable so that whenever a predetermined pressure has been applied to the plunger 60 the extension 78 is permitted to have an additional downward movement as shown in dotted lines in FIG. 14. The torque connection is so adjusted that if the insert is moved into place in its opening without releasing the torque connection, the operator will know that the insert is too loose and that it should be replaced with an insert of slightly larger diameter. If, on the other hand, the torque connection is released before the insert is placed in the opening and is not moved to final position by the slight impact on the punch which results from the free movement of the extension 78 to its lower limit of movement, the operator will know that insert is too tight and should be replaced with a slightly smaller insert. Molds differing slightly in diameter may be provided for making slightly oversized and slightly undersized inserts. The amount of binder in the compositions from which the inserts are molded may be varied to increase or decrease the shrinkage of the insert on baking and when desirable variations in diameter may be obtained by grinding.

As shown in FIG. 15, the extension 78 and the lever arm 71 are connected by a pivot 79 fixed to the arm 71 and are normally held against relative pivotal movement by means of a releasable detent comprising a disk 80 fixed to the pivot 79 and provided with a V-notch 81 and a roller 82 carried by a yoke 83 slidable in the extension 78 and engaging the notch 81. A rod 84 extending longitudinally of the extension 78 is attached to the yoke 83 and the yoke 83 is pressed towards the disk 80 by means of a spring 85 surrounding the rod 84 and interposed between the yoke and an adjustable follower 86 which slidably receives the outer end of the rod 84. The follower 86 is attached to a rod 87 which engages the outer end of an adjustable handgrip member 88. The hand grip 88 has screw-threaded engagement with the outer end of the tubular extension 78 and engages the outer end of the rod 87 and may be screwed toward the follower 86 to move the same toward the spring 85 and increase the pressure on the roller 82, the position of the handle 88 determining the pressure exerted on the spring 85. By properly adjusting the handle 88 a predetermined pressure will be required to release the roller 82 so as to enable the operator to determine whether the required amount of pressure has been applied to the insert. The pivotal movement of the extension 78 with respect to the lever arm 71 is limited by suitable means such as a lug 89 in the inner end of the extension 78 that engages with a pin 90 attached to the lever arm 71, so that the operator may apply pressure to an insert which requires only a slight additional movement to place it after release of the detent.

It is to be understood that in accordance with the provisions of the patent statutes, variations and modifications of the specific devices herein shown and described may be made without departing from the spirit of the invention.

What we claim is:

1. A refractory fixture for supporting a series of assemblies and for holding the parts of each assembly in predetermined relative positions while they are being joined together as a unit by fusion of one or more of the parts thereof comprising a refractory body provided with a series of spaced holes, and a refractory insert accurately sized with respect to and press fitted in each of said holes, each insert having a hard abrasion resistant face shaped to engage parts of an assembly and to retain them in predetermined relative positions while they are being subjected to heat, each insert having a coefficient of thermal expansion between limits, one lower and the other higher than that of said refractory body, and such that, when said fixture is subjected to the heat required for joining said parts, it will not be loosened in its hole or subject the material of said body to harmful stresses.

2. A refractory fixture as set forth in claim 1 in which the inserts are positioned in the holes of the body with its top face below the plane of the flat face of said body.

3. A refractory fixture as set forth in claim 1 in which the top faces of the inserts have recesses for positioning parts of the assemblies to be joined together.

4. A refractory fixture as set forth in claim 1 in which the inserts are each provided with spaced apertures to receive parts of an assembly that are to be joined together.

5. A refractory fixture for supporting a series of assemblies and for holding the parts of each assembly in predetermined relative positions while they are being joined together as a unit by fusion of one or more of the parts thereof comprising a refractory plate composed of a machinable carbon composition having a row of spaced cylindrical drilled holes and refractory inserts composed of a carbon composition of cylindrical form press fitted in said holes, each of said inserts being molded and baked to provide a hard abrasion resistant peripheral face and an end face shaped to engage parts of the assembly to be joined together and to retain said parts in predetermined relative positions while they are being subjected to heat, each insert having a coefficient of thermal expansion between limits, one lower and the other higher than that of said refractory body, and such that, when said fixture is subjected to the heat required for joining said parts, it will not be loosened in its hole or subject the material of said body to harmful stresses.

6. A refractory fixture for use in applying alloy dots to a semi-conductor comprising a flat plate of refractory carbon having a row of spaced cylindrical holes and a cylindrical insert press fitted in each hole, each insert being molded with a recess in its top face that conforms to the shape of the semi-conductor and a second shallow recess in the bottom of said first recess to receive and position a metal pellet in engagement with the under side of said semi-conductor and molded carbon weight resting on said semi-conductor.

7. A refractory fixture as set forth in claim 6 in which the carbon weight has means for positioning a metal pellet in contact with the top face of said semi-conductor.

8. A refractory fixture for fixing conductor wires in a body of glass which comprises a refractory plate having a row of spaced cylindrical holes, a molded insert press fitted in each hole, each having wire receiving holes molded therein and being positioned in said plate with its top face below the top face of the plate to provide a recess to receive a glass holding cup.

9. A refractory fixture for supporting a series of assemblies and for holding the parts of each assembly in predetermined relative positions while they are being joined together as a unit by fusion of one or more of the parts thereof comprising a refractory plate composed of a machinable carbon composition having a row of spaced cylindrical drilled holes and refractory inserts composed of a carbon composition of cylindrical form press fitted in said holes, each of said inserts being molded and baked to provide a hard abrasion-resistant peripheral face and an end face shaped to engage parts of the assembly to be joined together and to retain said parts in predetermined relative positions while they are being subjected to heat, each insert being accurately sized with respect to its opening for insertion into its opening by application of an axial pressure not less than a predetermined minimum and not higher than a predetermined maximum and each insert having a coefficient of expansion between tolerance limits, one lower and the other higher than that of the refractory body, and such that, when said fixture is subjected to the heat required for joining said parts, it will not be loosened in its hole or subject the material of said body to harmful stresses.

References Cited by the Examiner
UNITED STATES PATENTS

| | | | |
|---|---|---|---|
| 1,717,479 | 6/29 | Wakeman | 1—344 |
| 1,853,911 | 4/32 | McCabe | 65—138 |
| 2,313,025 | 3/43 | Scharfnagel | 65—138 |
| 2,365,273 | 12/44 | Johansson | 29—25.35 |
| 2,526,588 | 10/50 | Small | 65—140 |
| 2,608,745 | 9/52 | Barry | 29—25.35 |
| 2,722,248 | 11/55 | Anguera | 1—344 |
| 2,763,059 | 9/56 | Caton et al. | 29—525 |
| 2,777,162 | 1/57 | Banzhof | 18—16.5 |
| 2,796,633 | 6/57 | Carlson et al. | 18—16.5 |
| 2,862,470 | 12/58 | Williams | 113—99 |
| 2,942,568 | 6/60 | Hamilton et al. | 29—25.3 |
| 2,996,801 | 8/61 | Klossika | 29—525 |
| 3,054,174 | 9/62 | Rose et al. | 29—503 |
| 3,065,534 | 11/62 | Marino | 29—503 |
| 3,070,859 | 1/63 | Hamilton | 29—25.3 |

CHARLES W. LANHAM, *Primary Examiner.*
DONALL H. SYLVESTER, *Examiner.*